(12) United States Patent
Grant (10) Patent No.: US 12,508,733 B1
(45) Date of Patent: Dec. 30, 2025

(54) RETAINING DEVICE FOR SECURING WOOD TO A SAW MILL

(71) Applicant: David Earl Grant, Brewer, ME (US)

(72) Inventor: David Earl Grant, Brewer, ME (US)

(*) Notice: Subject to any disclaimer, the term of this patent is extended or adjusted under 35 U.S.C. 154(b) by 0 days.

(21) Appl. No.: 18/827,285

(22) Filed: Sep. 6, 2024

(51) Int. Cl.
*B27B 1/00* (2006.01)
*B27B 29/02* (2006.01)

(52) U.S. Cl.
CPC .............. *B27B 29/02* (2013.01); *B27B 1/00* (2013.01)

(58) Field of Classification Search
CPC ......... B27B 25/00; B27B 25/06; B27B 25/08; B27B 29/00; B27B 29/02; B27B 29/04; B27B 29/08; B27C 5/06; B27C 7/04
See application file for complete search history.

(56) References Cited

U.S. PATENT DOCUMENTS

| | | | | |
|---|---|---|---|---|
| 5,109,899 A * | 5/1992 | Henderickson | ......... | B27B 31/04 83/884 |
| 5,165,458 A * | 11/1992 | Hirsch | ................. | B23Q 1/4804 144/368 |
| 5,243,888 A * | 9/1993 | Bowlin | ................... | B27B 15/00 83/810 |
| 6,775,917 B1 * | 8/2004 | Campbell | ............... | B27B 25/10 83/435.14 |
| 8,695,652 B1 * | 4/2014 | Pattullo | ..................... | B27B 1/00 269/131 |
| 10,710,817 B2 * | 7/2020 | Rothwell | ................. | B27M 1/08 |
| 2003/0070727 A1 * | 4/2003 | Stephens | ............. | B25H 1/0021 144/1.1 |

* cited by examiner

*Primary Examiner* — Matthew Katcoff
(74) *Attorney, Agent, or Firm* — Anthony D. Pellegrini (57) ABSTRACT

The present invention discloses a system for retaining a piece of wood onto a saw mill in an orientation at an angle to the horizontal, such that horizontal cuts made to the wood result in shorter planks with full exposure of wood end grain, and further, a system for rotating a piece of wood on a saw mill in order to create lumber with specific polygonal cross sections; and methods for producing lumber from pieces of wood using said systems.

11 Claims, 12 Drawing Sheets

RETAINING DEVICE FOR SECURING WOOD TO A SAW MILL

CROSS REFERENCE TO RELATED APPLICATIONS

This application claims the benefit of provisional application, U.S. Ser. No. 63/458,368, filed Apr. 10, 2023, entitled RETAINING DEVICE FOR SECURING WOOD TO A SAW MILL, by Grant, David E., which is hereby incorporated by reference.

BACKGROUND OF THE INVENTION

The present invention relates to saw mills, and more particularly, to accessories for saw mills. Saw mills are well known in the industry. They are used to convert raw wood into lumber by cutting off outer portions of logs such that the resulting cut wood has regular surfaces and lengths. One design of saw mill comprises a pair of horizontally oriented parallel rails and a horizontally oriented cutting saw. The cutting saw is positioned above the rails and is mounted on a carriage which moved along the rails. A piece of wood—either a raw log or a partially cut piece of wood—is placed onto the saw mill between the rails, in an orientation parallel to the rails, and the cutting saw is moved into and along an upper portion of the piece of wood, cutting off said upper portion. A generally cylindrical log will be cut four times, with a 90 degree rotation after each cut, resulting in a piece of wood having a rectangular cross section. Further cuts may be made to the partially cut piece of wood, resulting in planks being made.

While the formation of rectangular planks from pieces of wood is the traditional use of saw mills, there are other finished products that are quite valuable but up to now could not be made using saw mills. For example, flooring, cabinetry, tabletops, and the like are often fashioned by fitting together small geometric pieces of wood into aesthetically pleasing designs. These geometric pieces of wood would have to be fashioned using jigsaws or other precise cutting devices, entailing much time and expense. The present invention seeks to take advantage of the efficiency of a saw mill to create geometric pieces of wood quickly and cost effectively.

The present invention discloses a system for retaining the piece of wood onto the saw mill in an orientation at an angle to the horizontal. Such an orientation causes the horizontal cuts made by the cutting saw to form shorter planks with a greater exposure of wood grain. It also creates elongated shapes of the resulting planks. For example, a piece of wood fashioned into a piece of lumber having a square cross section will, when oriented at an angle to the horizontal, result in elongated diamond shaped planks. The steeper the angle, the squatter the diamonds. Similarly, pieces of wood with other polygonal cross sections will yield elongate hexagons, pentagons, octagons, and the like. These geometric shapes are ideal for creating flooring, cabinetry, tabletops, and other wood-surfaced products having an intricate, interlocking appearance.

The present invention also discloses a system for fashioning pieces of wood into lumber having specific polygonal cross sections, to be used with the above-described system. This system uses the same saw mill and cutting saw as described above, but allows for rotation of the piece of wood other than strictly 90 degrees (though 90 degree rotations are also contemplated). Thus, a piece of wood intended to be fashioned into lumber having a hexagonal cross section will be rotated 60 degrees after each horizontal cut of the cutting saw. A piece of wood intended to be fashioned into lumber having a triangular cross section will be rotated 120 degrees after each horizontal cut of the cutting saw. And so on. Using this embodiment provides the specific shaped lumber to be used to cut the short elongated shaped planks as described above.

Specific methods for using the aforementioned embodiments are also described and claimed.

It is therefore shown that a novel method of cutting pieces of wood on existing saw mills results in new and useful product to be used for finished wood-surfaced items.

It is therefore an object of the present invention to provide an attachment to a saw mill that allows for a piece of wood to be cut while oriented at an angle to the horizontal.

It is a further object of the present invention to provide an attachment to a saw mill that allows for a piece of wood to be fashioned into lumber having a polygonal cross section.

It is yet a further object of the present invention to provide methods for operating the attachments to the saw mill to achieve the above-stated objects.

Other objects of the present invention will be readily apparent from the description that follows.

SUMMARY

The present invention discloses a system of attachments that can be added to a saw mill having a pair of rails and a horizontally oriented cutting saw. The system is comprised of a support carriage configured to retain a piece of wood in an orientation that is angled to the horizontal. The support carriage is positionable, so that the angle to the horizontal may be adjusted as desired, to produce differently shaped resultant planks. After one or more cuts are made to the piece of wood by the cutting saw, the remaining portion of the piece of wood is moved up the support carriage so that additional cuts may be made. The support carriage may comprise rollers and guides to assist with the repositioning of the piece of wood.

The present invention also discloses a system of attachments that can be added to a saw mill that comprises a pair of engagement devices. The engagement devices are attached to cross members of the saw mill and are spaced apart from each other. Each engagement device has a vertical orientation relative to the saw mill. A piece of wood is placed between the two engagement devices and secured thereto, such that the cutting saw of the saw mill can pass over the top portion of the piece of wood and make a horizontal cut. The attachment mechanisms of the two engagement devices rotate, allowing the piece of wood to be rotated precisely between cuts. The first engagement device comprises means for positioning and then locking the piece of wood into the desired orientation in anticipation of a cut. A piece of wood intended to have a pentagonal cross section, for example, will be secured between the two engagement devices and locked into place, with the cutting saw making a first cut. Then the first engagement device is unlocked, the piece of wood is rotated 72 degrees, and the first engagement device is relocked. A second cut is made. The piece of wood is rotated three more times, each time by 72 degrees, and cut by the cutting saw. Then end result is a piece of lumber having a pentagonal cross section. Different polygonal and irregular polygonal cross sections can be made by choosing different sequences of positioning and rotation of the piece of wood.

In addition to the attachments to the saw mill, the present invention also discloses methods of using the attachments to create finished product. In one embodiment, the method involves procuring the saw mill attachments as described above, installing the pair of engagement devices onto the saw mill, fashioning the piece of wood as desired, removing the piece of wood and the engagement devices from the saw mill, attaching the support carriage to the saw mill and positioning it as desired, placing the fashioned piece of lumber onto the support carriage and securing it thereto, and making a series of cuts to the piece of lumber with the cutting saw to create finished product. If prefashioned lumber is used, the first several steps of the method may be skipped, and the method begins with installing the support carriage. If the final product is a shaped piece of lumber, the final steps of the method may be skipped, with the method ending after all desired cuts to the piece of wood have been made and the piece of wood and the engagement devices are removed from the saw mill.

It is to be understood that the foregoing and following description of the invention is intended to be illustrative and exemplary rather than restrictive of the invention as claimed. These and other aspects, advantages, and features of the invention will become apparent to those skilled in the art after review of the entire specification, accompanying figures, and claims incorporated herein.

DETAILED DESCRIPTION OF THE INVENTION

Figure 1A:
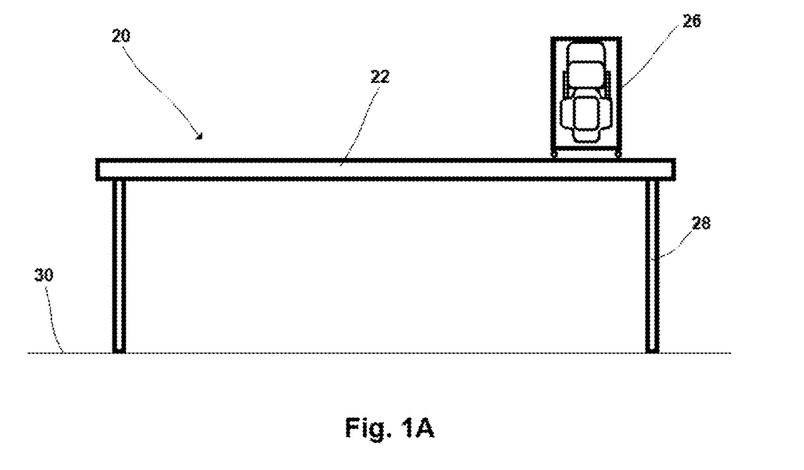
FIG. 1A is a side view of a typical saw mill having pair of horizontally oriented parallel rails and a horizontally oriented cutting saw.
Figure 1B:
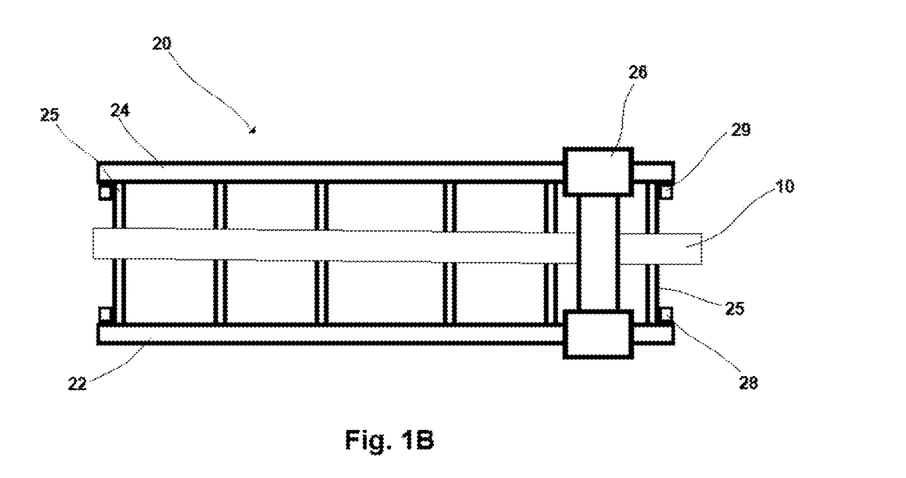
FIG. 1B is a top view of the saw mill shown in FIG. 1A, depicted with a piece of wood placed thereon.

The present invention discloses a retaining device 1 for securing a piece of wood 10 to a saw mill 20. The saw mill 20 must be configured with a cutting saw 26, a first rail 22 and a second rail 24, with the first and second rails 22,24 spaced apart and oriented parallel to each other and both being horizontally oriented, a first support leg 28 and a second support leg 29 spaced apart and oriented parallel to each other and perpendicular to the first and second rails 22,24 and both being vertically oriented, and a plurality of cross members 25, with each of the plurality of cross members 25 running between the first and second rails 22,24 and attached thereto, said cross members 25 oriented substantially perpendicular to said rails 22,24. See FIGS. 1A and 1B. The cutting saw 26 is horizontally oriented and is positioned above the first and second rails 22,24. A piece of wood 10 (typically a log) is placed horizontally onto the saw mill 20 between the first and second rails 22,24 and the cutting saw 26 is moved horizontally into an end of the piece of wood 10 and then through the piece of wood 10, cutting a slice from the upper portion of the piece of wood 10 and leaving a planar surface on the remaining portion of the piece of wood 10.

Figure 4A:
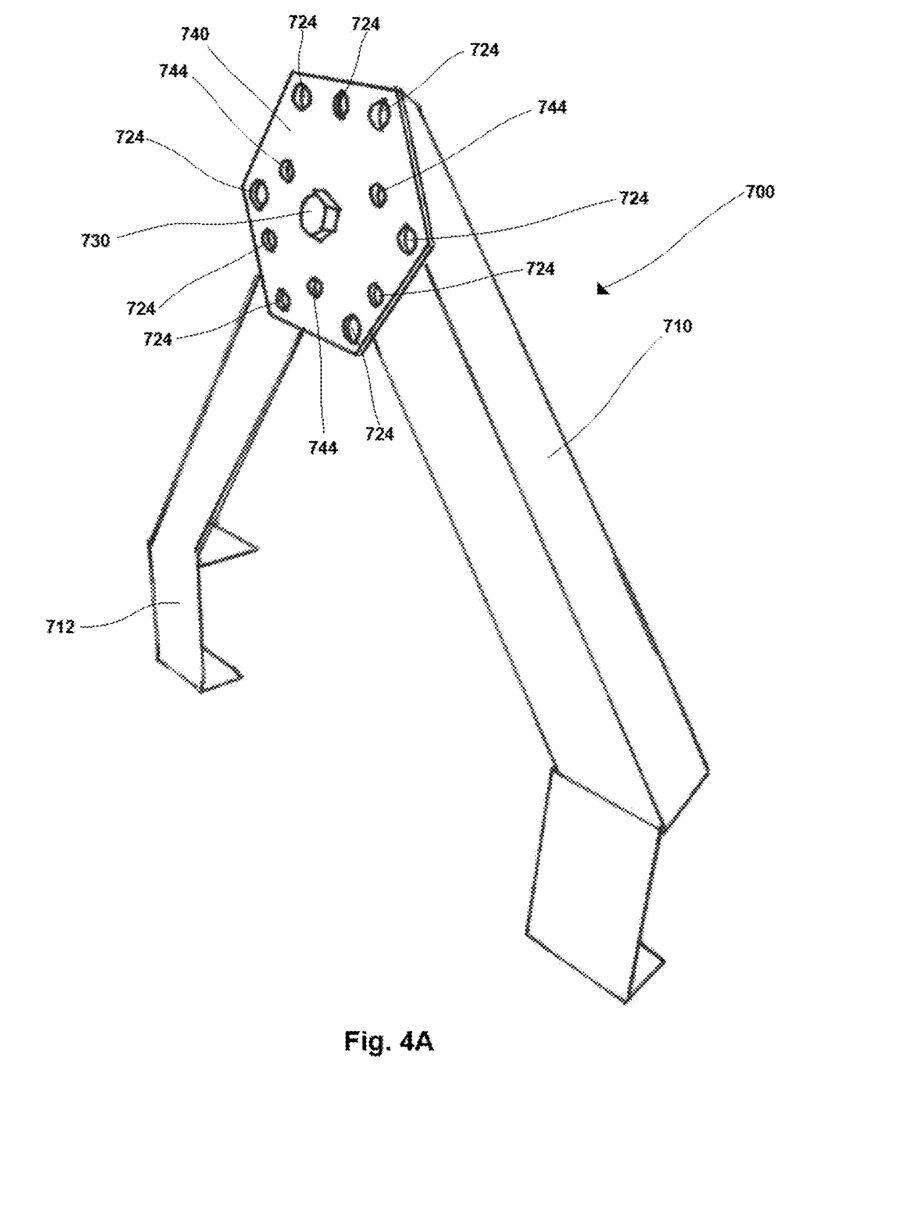
FIG. 4A is a perspective view of a portion of the embodiment of the retaining device depicted in FIG. 2, showing the front of the first engagement device.
Figure 4B:
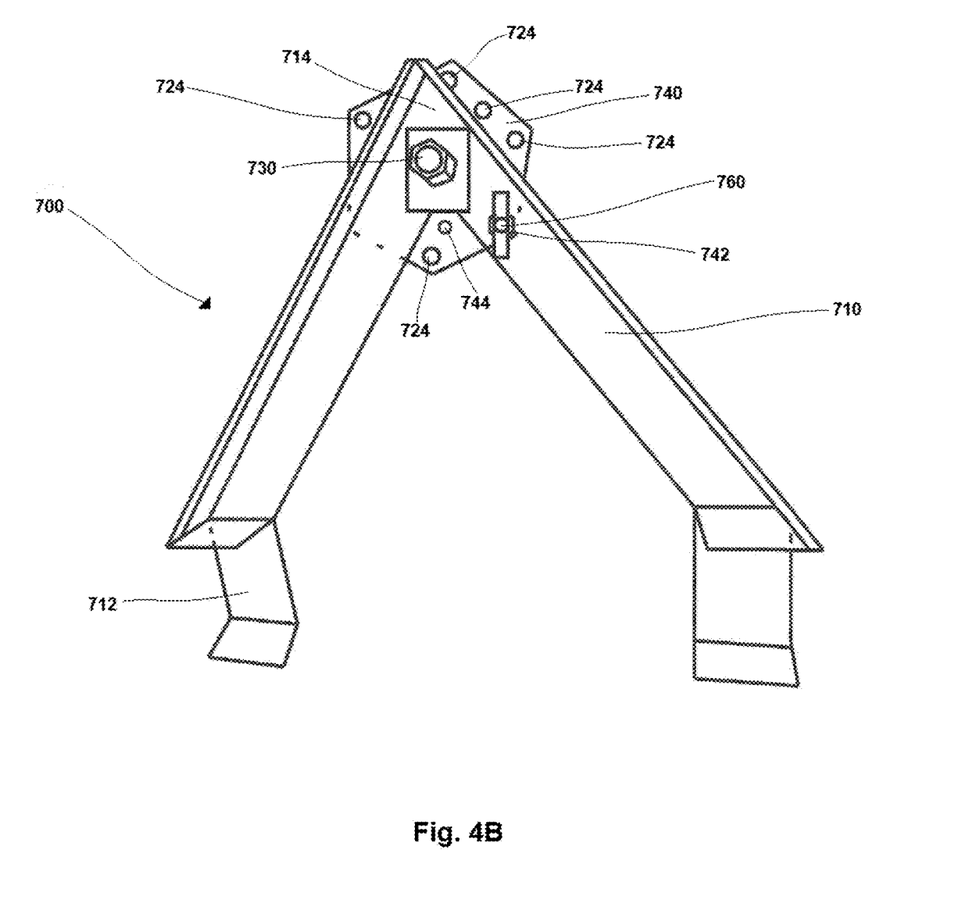
FIG. 4B is a perspective view of a portion of the embodiment of the retaining device depicted in FIG. 2, showing the rear of the first engagement device.

In one embodiment, the retaining device 1 has a first engagement device 700 and a second engagement device 800. See FIG. 2. The first engagement device 700 and the second engagement device 800 are configured to cooperatively secure the piece of wood 10. In this embodiment, the first engagement device 700 comprises an elongate vertical support element 710 having a first end 712 and a second end 714, a locking aperture 742 located on the vertical support element 710, a rotating disk 740 having a plurality of positioning apertures 724 disposed about the rotating disk 740 proximate to a perimeter of the rotating disk 740, a plurality of fastener apertures 744 disposed about the rotating disk 740, an axle 730, a plurality of fasteners 750 with each fastener 750 configured to pass through one of the fastener apertures 744 of the rotating disk 740, and a locking pin 760 configured to be inserted into and through one of the positioning apertures 724 of the rotating disk 740 of the first engagement device 700 and into the locking aperture 742 of the first engagement device 700. See FIGS. 4A, 4B, and 6A. The first end 712 of the vertical support element 710 of the first engagement device 700 is attached to one of the cross members 25 of the saw mill 20, the axle 730 of the first engagement device 700 is inserted into and through a central aperture 722 located at the second end 714 of the vertical support member 710 of the first engagement device 700, and the rotating disk 740 of the first engagement device 700 is rotationally attached to the axle 730 of the first engagement device 700. In an alternative embodiment, the vertical support element 710 may comprise a pair of legs, with each leg having a first end and a second end, with the first ends of the legs collectively corresponding to the first end 712 of the vertical support element 710 and being spaced apart from each other, and the second ends of the legs collectively corresponding to the second end 714 of the vertical support element 710 and being attached to each other. In these embodiments, the locking aperture 742 is located on just one of the legs of the vertical support element 710 proximate to the second end 714 of the vertical support member 710.

Figure 5A:
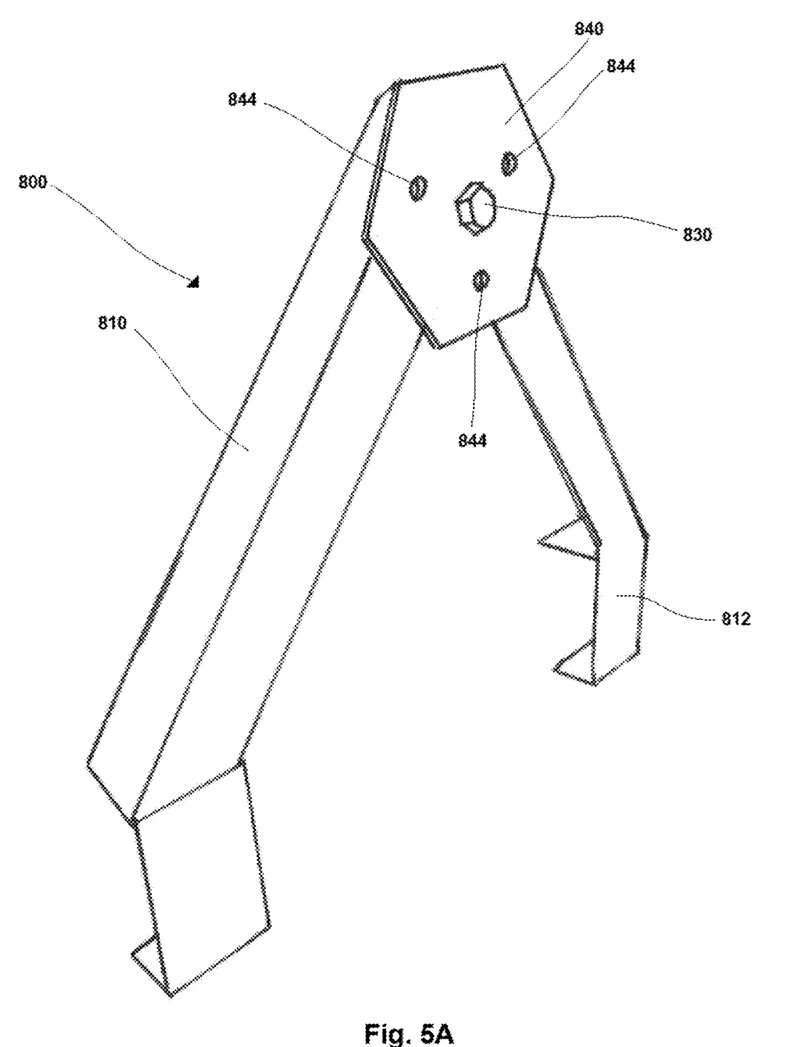
FIG. 5A is a perspective view of a portion of the embodiment of the retaining device depicted in FIG. 2, showing the front of the second engagement device.
Figure 5B:
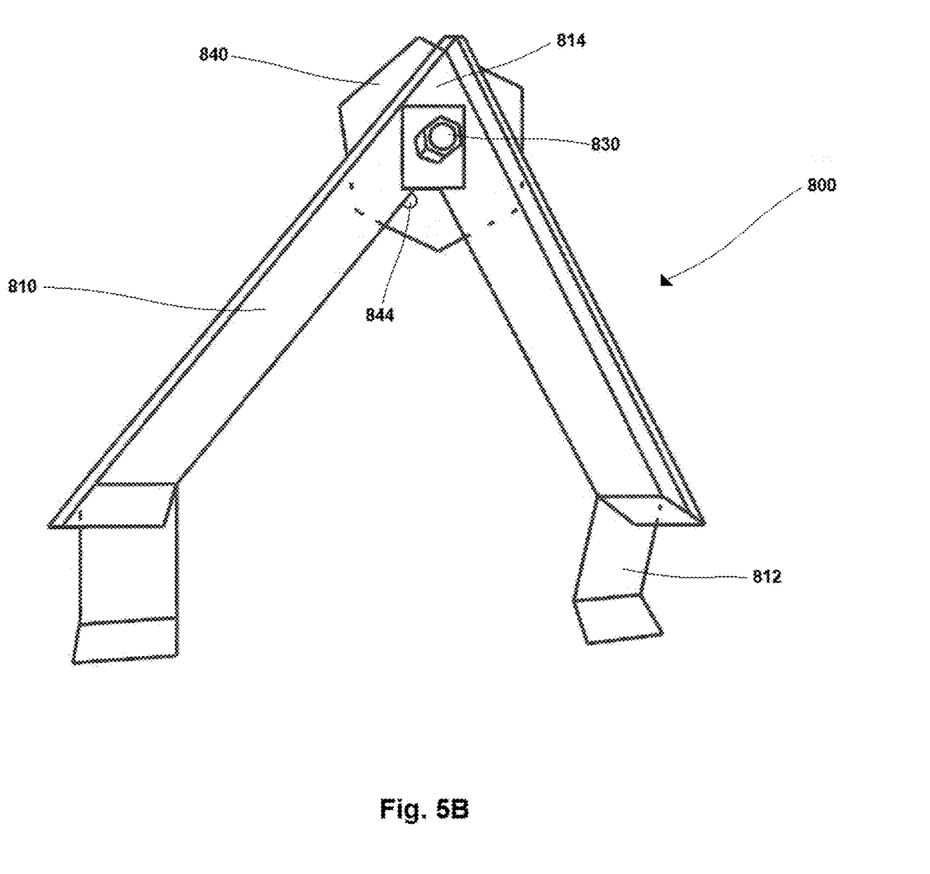
FIG. 5B is a perspective view of a portion of the embodiment of the retaining device depicted in FIG. 2, showing the rear of the second engagement device.

The second engagement device 800 is located on the saw mill 20 at a location spaced apart from the first engagement device 700. The second engagement device 800 comprises an elongate vertical support element 810 having a first end 812 and a second end 814, a rotating disk 840 having a plurality of fastener apertures 844 disposed about the rotating disk 840, an axle 830, and a plurality of fasteners 850 with each fastener 850 configured to pass through one of the fastener apertures 844 of the rotating disk 840. See FIGS. 5A, 5B, and 6B. The first end 812 of the vertical support element 810 of the second engagement device 800 is attached to one of the cross members 25 of the saw mill 20, with said cross member 25 being spaced apart from the cross member 25 onto which the first engagement device 700 is attached, the axle 830 of the second engagement device 800 is inserted into and through a central aperture 822 located at the second end 814 of the vertical support member 810 of the second engagement device 800, and the rotating disk 840 of the second engagement device 800 is rotationally attached to the axle 830 of the second engagement device 800. In an alternative embodiment, the vertical support element 810 may comprise a pair of legs, with each leg having a first end and a second end, with the first ends of the legs collectively corresponding to the first end 812 of the vertical support element 810 and being spaced apart from each other, and the second ends of the legs collectively corresponding to the second end 814 of the vertical support element 810 and being attached to each other.

Figure 6A:
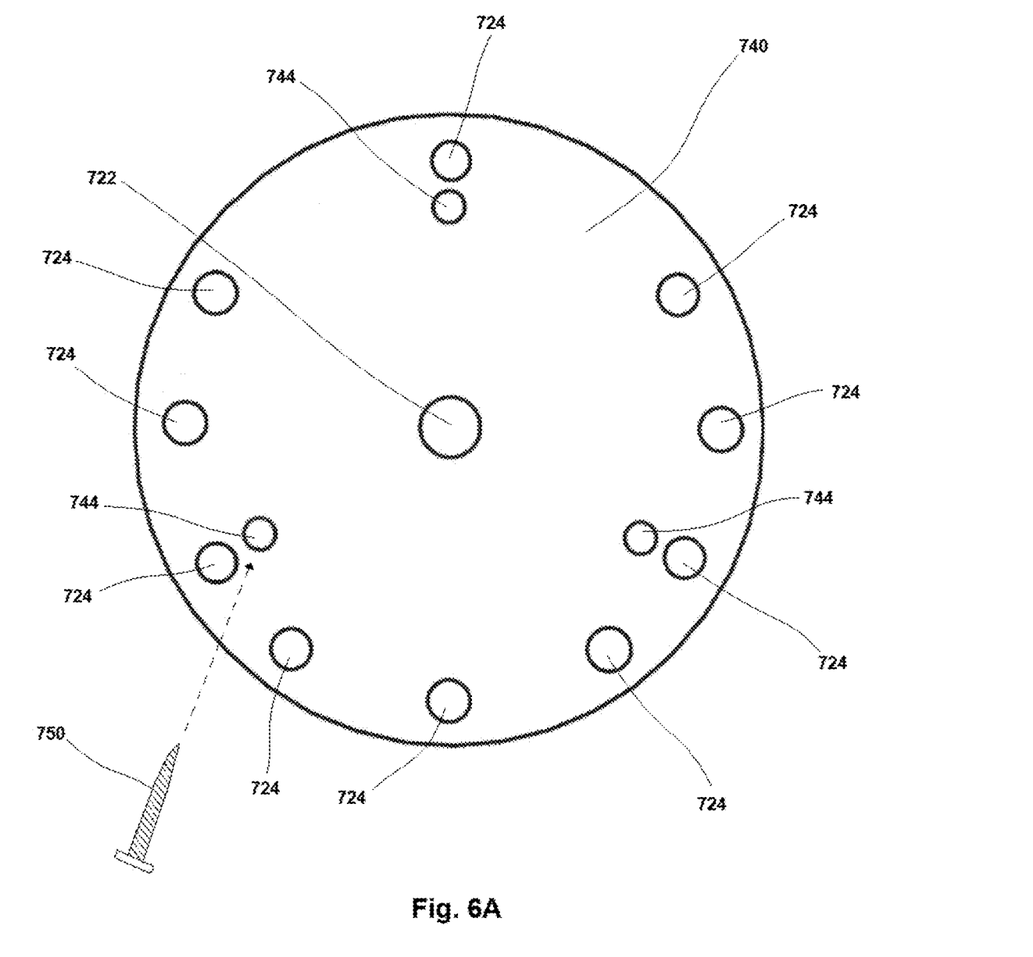
FIG. 6A is a plan front view of a portion of the embodiment of the retaining device depicted in FIG. 2, showing the rotating disk of the first engagement device. A fastener is shown with an arrow indicating how it is to be inserted into a fastening aperture.
Figure 6B:
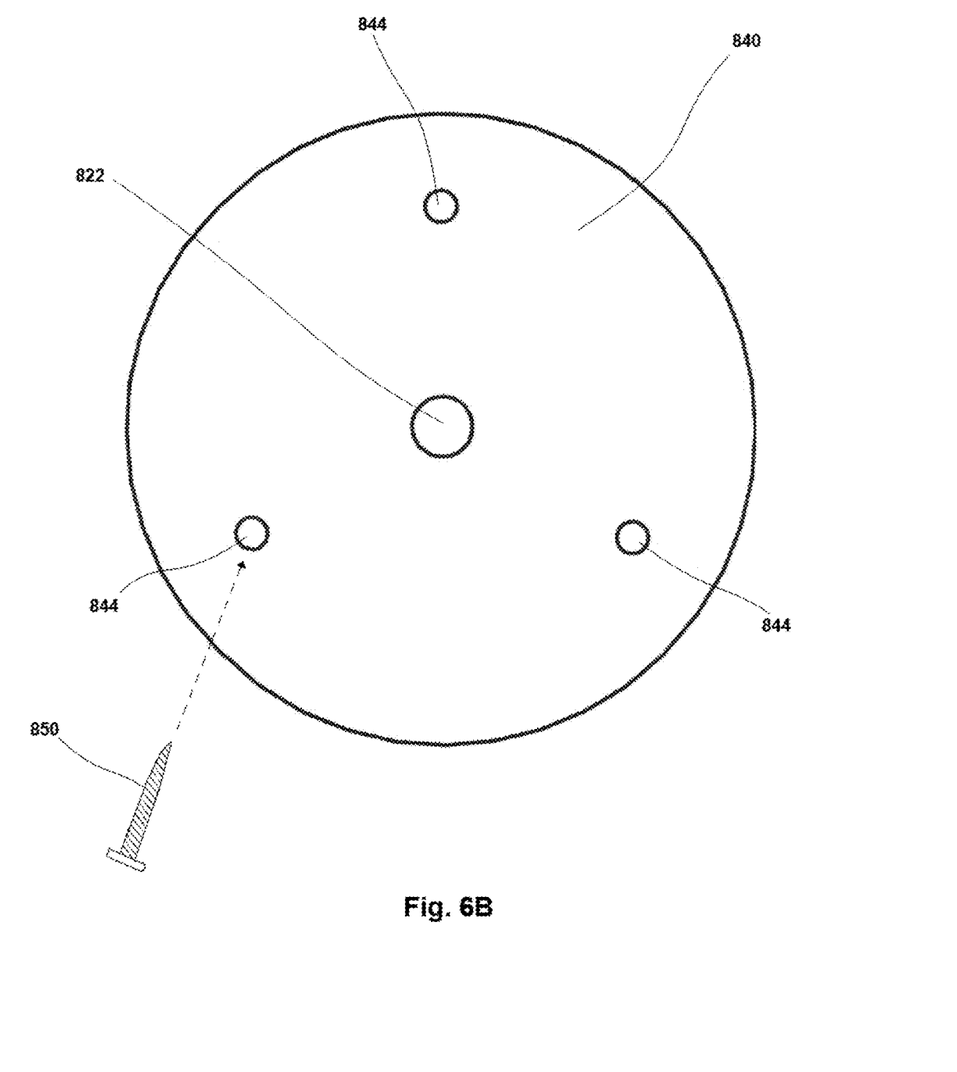
FIG. 6B is a plan front view of a portion of the embodiment of the retaining device depicted in FIG. 2, showing the rotating disk of the second engagement device. A fastener is shown with an arrow indicating how it is to be inserted into a fastening aperture.

The first engagement device 700 has an unlocked mode and a locked mode, with the rotating disk 740 of the first engagement device 700 configured to rotate when in unlocked mode and not to rotate when in locked mode. Rotation of the rotating disk 740 of the first engagement device 700 when in unlocked mode allows one of the positioning apertures 724 of the rotating disk 740 of the first engagement device 700 to come into alignment with the locking aperture 742 of the first engagement device 700, and insertion of the locking pin 760 of the first engagement device 700 through an aligned positioning aperture 724 of the rotating disk 740 of the first engagement device 700 and the locking aperture 742 of the first engagement device 700 places the first engagement device 700 in locked mode. Removal of the locking pin 760 from the positioning and locking apertures 724,742 places the first engagement device 700 in unlocked mode.

Figure 2:
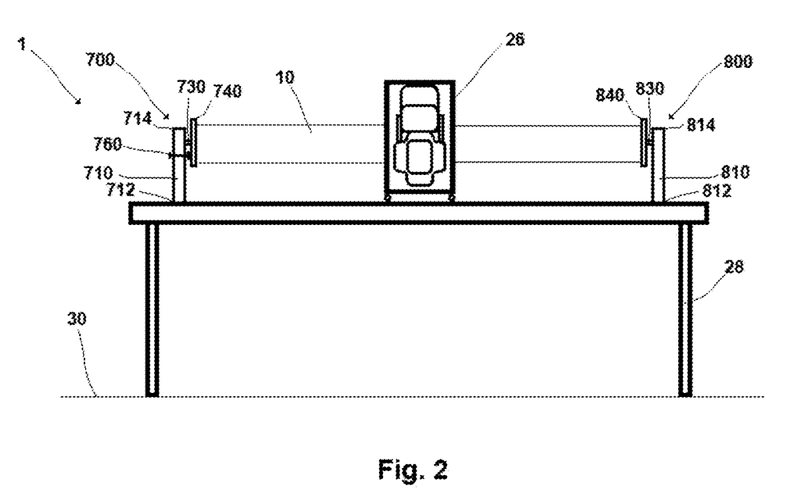
FIG. 2 is a side view of one embodiment of the present invention, depicting the retaining device comprised of a first engagement device and a second engagement device, with a piece of wood retained by the retaining device in a horizontal orientation.

A piece of wood 10 is secured by the retaining device 1 by placing the piece of wood 10 between the first engagement device 700 and the second engagement device 800, inserting the plurality of fasteners 750 of the first engagement device 700 through the plurality of fastener apertures 744 of the rotating disk 740 of the first engagement device 700 and into a first end 12 of the piece of wood 10, inserting the plurality of fasteners 850 of the second engagement device 800 through the plurality of fastener apertures 844 of the rotating disk 840 of the second engagement device 800 and into a second end 14 of the piece of wood 10, and placing the first engagement device 700 into locked mode. In one embodiment the plurality of fasteners 750,850 may be wood screws. Once one or more cuts are made to the piece of wood 10, the first engagement device 700 may be placed into unlocked mode, the piece of wood 10 may then be rotated to a new orientation, the first engagement device 700 may be placed into locked mode, and additional cuts may be made to the piece of wood 10.

Figure 3:
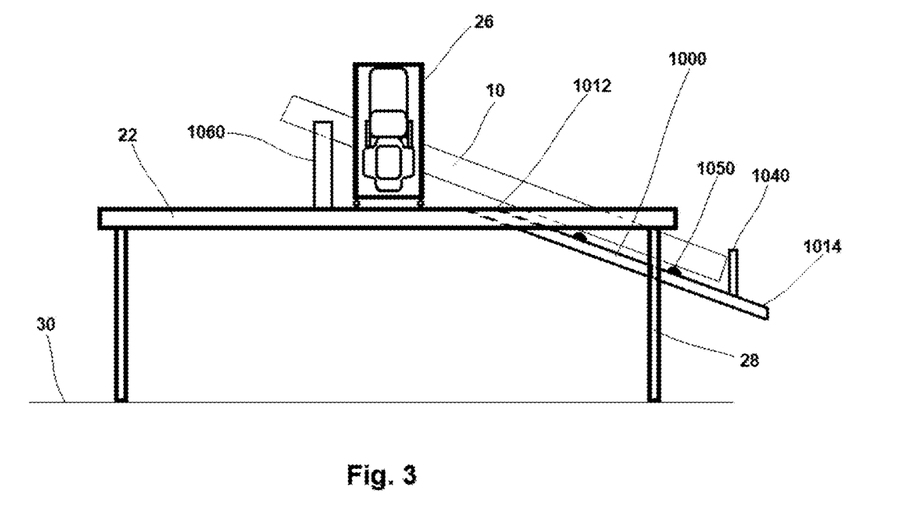
FIG. 3 is a side view of another embodiment of the present invention, depicting the retaining device comprised of a support carriage and clamping member, with a piece of wood retained by the retaining device at an angle to the horizontal.

In another embodiment, the retaining device 1 comprises a support carriage 1000. The support carriage 1000 is elongate and rigid, and is configured to support a piece of wood 10. See FIG. 7. The support carriage 1000 is pivotally attached at its first end 1012 to one of the cross members 25 of the saw mill 20. In one embodiment, the second end 1014 of the support carriage 1000 is placed onto a surface 30, such as a floor or the ground. Because the surface 30 is positioned lower than the cross member 25, the support carriage 1000 is oriented at an angle to the horizontal. When a piece of wood 10 is placed onto the support carriage 1000, the piece of wood 10 is likewise held at an angle to the horizontal. To change the angle of the support carriage 1000 in this embodiment, one or more shims may be placed between the second end 1014 of the support carriage 1000 and the surface 30. The more shims that are interposed between the second end 1014 of the support carriage 1000 and the surface 30, the shallower the angle of the support carriage 1000 to the horizontal will be.

Figure 7:
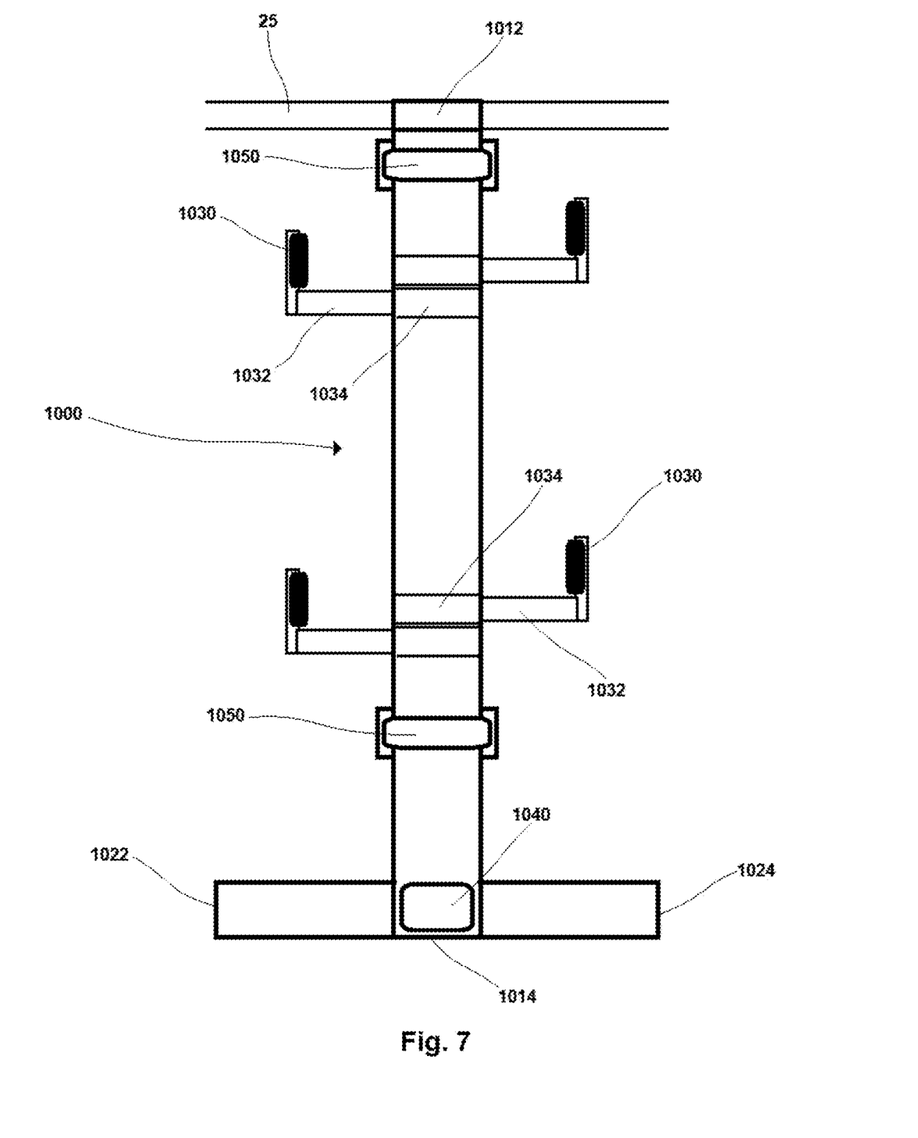
FIG. 7 is a top view of the embodiment of the retaining device depicted in FIG. 3, showing the support carriage.

In another embodiment, the second end 1014 of the support carriage 1000 is removably attached to a lower portion of the saw mill 20. Because the lower portion of the saw mill 20 is positioned lower than the cross member 25, the support carriage 1000 is oriented at an angle to the horizontal. Repositioning the second end 1014 of the support carriage 1000 upward or downward on the lower portion of the saw mill 20 allows the degree of the angle of the support carriage 1000 to the horizontal to be modified as desired. In one embodiment, the lower portion of the saw mill 20 is the first support leg 28 of the saw mill 20 and the second support leg 29 of the saw mill 20. The first side 1022 of the support carriage 1000 located proximate to the second end 1014 of the support carriage 1000 is removably attached to the first support leg 28 of the saw mill 20, and the second side 1024 of the support carriage 1000 located proximate to the second end 1014 of the support carriage 1000 is removably attached to the second support leg 29 of the saw mill 20. To change the angle of the support carriage 1000 in this embodiment, the second end 1014 of the support carriage 1000 is repositioned along the first and second legs 28,29 of the saw mill 20, such that when the second end 1014 of the support carriage 1000 is positioned higher along the first and second legs 28,29 of the saw mill 20, the shallower the angle of the support carriage 1000 will be, and when the second end 1014 of the support carriage 1000 is positioned lower along the first and second legs 28,29 of the saw mill 20, the steeper the angle of the support carriage 1000 will be. The second end 1014 of the support carriage 1000 may be removably secured to the first and second legs 28,29 of the saw mill 20 by a plurality of pins placed through apertures formed in the sides 1022, 1024 of the support carriage 1000 and through a series of vertically spaced apart apertures formed in the first and second legs 28,29 of the saw mill 20. Alternatively, the second end 1014 of the support carriage 1000 may be removably secured to the first and second legs 28,29 of the saw mill 20 by a pair of clamping members, one clamping member located on each of the first and second sides 1022, 1024 of the support carriage 1000, with each clamping member configured to be secured to one of the first and second legs 28,29 of the saw mill 20. Other means for removably securing the second end 1014 of the support carriage 1000 to the first and second legs 28,29 of the saw mill 20 are also contemplated.

In preferred embodiments of the support carriage 1000, there are one or more laterally oriented central rollers 1050. The piece of wood 10 is placed onto the one or more central rollers 1050, facilitating movement of the piece of wood 10 along the support carriage 1000. The one or more central rollers 1050 may be made of metal, wood, plastic, rubber, or other materials. Each central roller 1050 has an axel about which the central roller rotates, with said axel being affixed to the support carriage 1000.

In yet another embodiment of the support carriage 1000, there are a plurality of laterally oriented guide rollers 1030. The piece of wood 10 is supported by the support carriage 1000 by being placed onto the plurality of guide rollers 1030. Preferably, there are an equal number of guide rollers 1030 located on either side of the support carriage 1000, such that the piece of wood 10 is supported between pairs of guide rollers 1030. Each guide roller 1030 is mounted on a lateral arm 1032 which is attached to the support carriage 1000. The one or more guide rollers 1030 may be made of metal, wood, plastic, rubber, or other materials. Each guide roller 1030 has an axel about which the guide roller 1030 rotates, with said axel being affixed to the corresponding lateral arm 1032. In the most preferred embodiments, the lateral arms 1032 may be moveably attached to the support carriage 1000 such that each lateral arm 1032 is capable of being repositioned laterally with respect to the support carriage 1000, thereby allowing for differing distances between pairs of guide rollers 1030 in order to accommodate different diameters of the piece of wood 10 placed therebetween. In one embodiment, the lateral arm 1032 of the guide roller 1030 is fitted into a lateral sleeve 1034 attached to the support carriage 1000, with the lateral arm 1032 moveably positionable within the lateral sleeve 1034, and there further being a means for fixing the position of the lateral arm 1032 within the lateral sleeve 1034, such as a locking pin, a clamp, or any other mechanism known in the art.

In other embodiments, there is a stop member 1040 removably attached to the support carriage 1000 behind the piece of wood 10. As the piece of wood 10 is slid upwards along the support carriage 1000, the stop member 1040 is repositioned against the back of the piece of wood 10 to prevent it from sliding backwards. The stop member 1040 may be removably secured to the support carriage 1000 by any appropriate means, including, for example, by a pair of pins extending downward into a series of apertures formed into the sides 1022,1024 of the support carriage 1000. Alternatively, the stop member 1040 may be removably secured to the support carriage 1000 by a pair of clamping members, one clamping member located on each side of the stop member 1040 and configured to grip one of the sides 1022, 1024 of the support carriage 1000. Other means for removably securing the stop member 1040 to the support carriage 1000 are also contemplated.

Figure 8A:
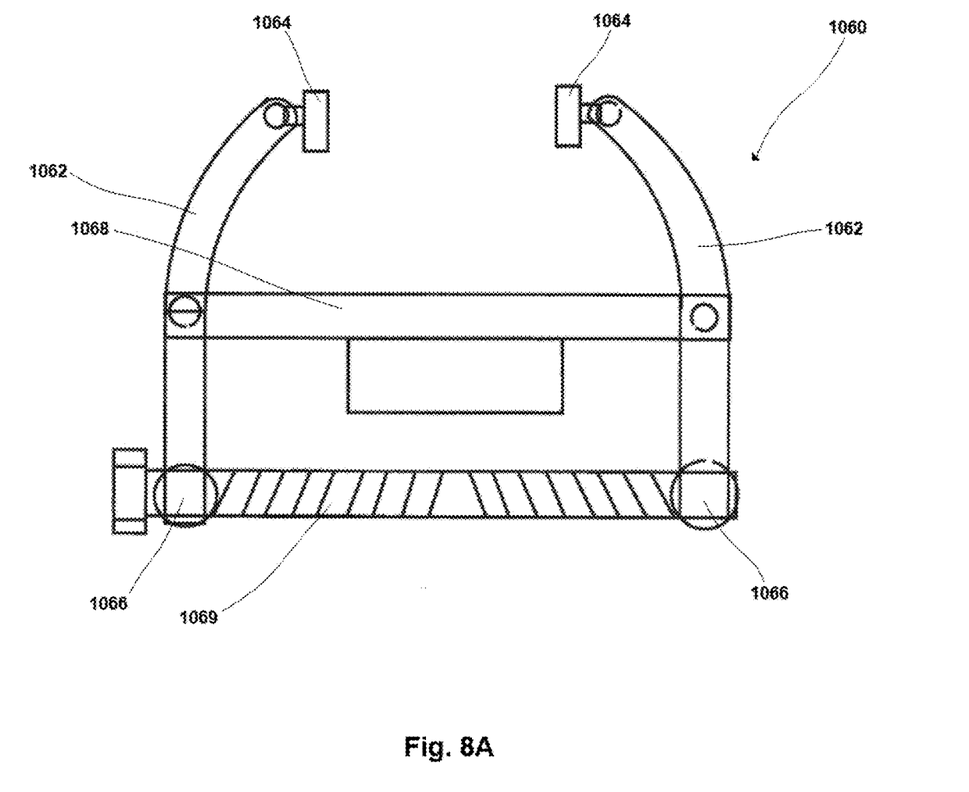
FIG. 8A is a plan front view of one embodiment of a clamping member of the retaining device.
Figure 8B:
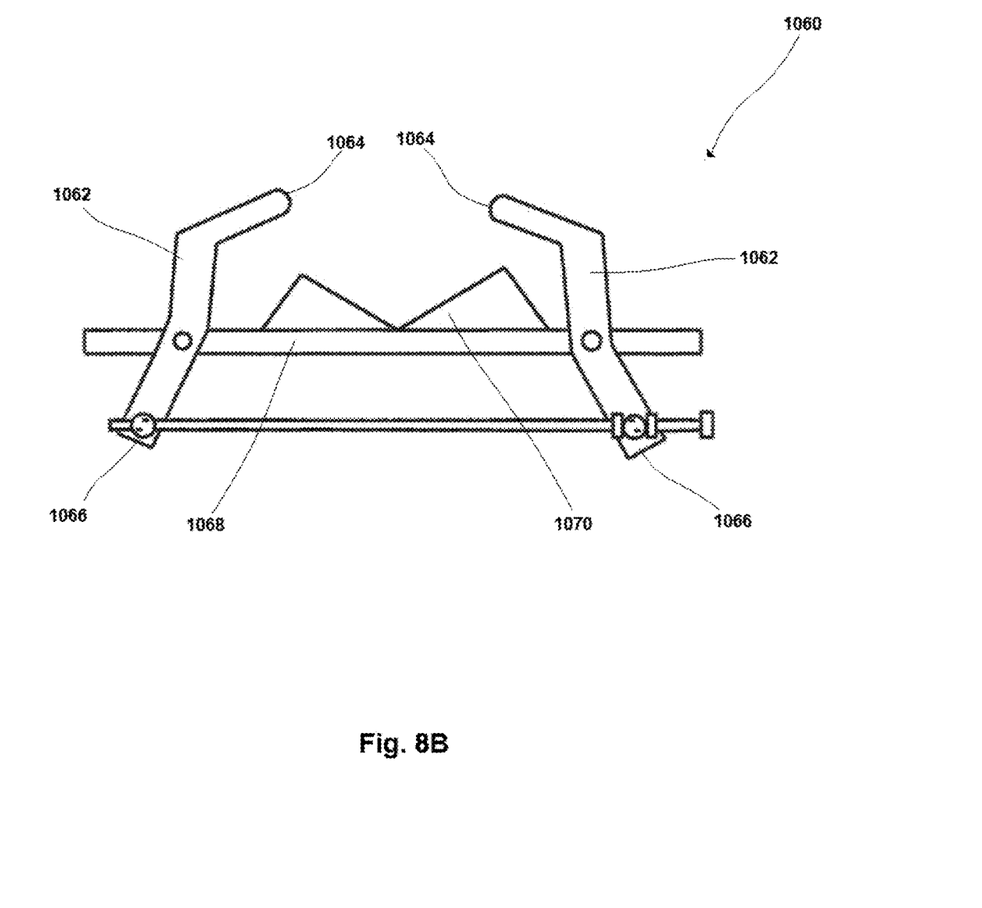
FIG. 8B is a plan front view of another embodiment of a clamping member of the retaining device.

In another embodiment of the present invention, the support carriage 1000 further comprises one or more clamping members 1060. See FIGS. 8A and 8B. Each clamping member 1060 is configured to secure the piece of wood 10 to the support carriage 1000. In one embodiment, the clamping member 1060 has a pair of clamping arms 1062 which may be brought together or spread apart. The clamping arms 1062 are joined to a lateral cross piece 1068. The clamping member 1060 is placed onto the support carriage 1000 with the cross piece 1068 placed against the upper side of the support carriage 1000, and then the clamping arms 1062 are brought together until they contact the piece of wood 10 that has been placed onto the support carriage 1000. In one embodiment, the clamping arms 1062 are pivotally attached to either end of the cross piece 1068, and the distal (non-clamping) ends 1066 of the clamping arms 1062 are joined together by a threaded rod 1069, which is located below the support carriage 1000. Rotation of the threaded rod 1069 in one direction moves the distal ends 1066 of the clamping arms 1062 towards each other, thereby simultaneously moving the clamping ends 1064 of the clamping arms 1062 away from each other, allowing the piece of wood 10 to be placed between or removed from the clamping member 1060, while rotation of the threaded rod 1069 in the opposite direction moves the distal ends 1066 of the clamping arms 1062 away from each other, thereby simultaneously moving the clamping ends 1064 of the clamping arms 1062 towards each other and into the piece of wood 10, thereby clamping it securely to the support carriage 1000. In yet another embodiment, the clamping member 1060 may comprise a cradle 1070 shaped to accommodate a piece of wood 10 cut with a polygonal (either regular or irregular) cross section. For example, if the piece of wood 10 is cut into a hexagonal cross section, the cradle 1070 will be an open triangle, apex downward, having a sixty degree angle. If the piece of wood 10 is cut into a square cross section, the cradle 1070 will have a ninety degree angle. Other polygonal cross sections may be accommodated by differently configured cradles 1070.

The present invention also comprises a method for forming geometric panels from a piece of wood 10 using a saw mill 20. As described above, the saw mill 20 comprises a cutting saw 26, a first rail 22, a second rail 24, a plurality of cross members 25, a first support leg 28, and a second support leg 29. The first and second rails 22,24 are spaced apart and oriented parallel to each other, with the first and second rails 22,24 being horizontally oriented. The first support leg 28 is attached to the first rail 22 and oriented substantially perpendicular to the first rail 22, and the second support leg 29 is attached to the second rail 24 and oriented substantially perpendicular to the second rail 24. The cutting saw 26 is positioned above the first and second rails 22,24.

The method comprises the following steps:

Step A: procure the saw mill 20;

Step B: procure the piece of wood 10;

Step C: procure the retaining device 1 configured with the support carriage, as described above;

Step D: install said retaining device 1 onto the saw mill 20 such that the support carriage 1000 is set at a desired angle from the horizontal (the steeper the angle, the smaller the panels will be, while the shallower the angle, the larger the panels will be);

Step E: secure the piece of wood 10 to the saw mill 20 using said retaining device 1; and Step F: use the saw mill 20 to make a plurality of cuts to the piece of wood 10. Where the support carriage 1000 comprises a stop member 1040, the stop member 1040 is moved upwards along the support carriage 1000 together with the piece of wood 10 if the piece of wood 10 is moved up along the support carriage 1000, thereby preventing the piece of wood 10 from sliding backwards along the support carriage 1000.

Steps A, B, and C may occur in any order. Step D should occur after Steps A, B, and C have been completed. Steps D, E, and F must occur in the order as stated.

The above-described method may be used with a piece of wood 10 having a polygonal (regular or irregular) cross section. While any polygonal cross section may be used, in preferred embodiments the piece of wood 10 will have a hexagonal cross section.

The above-described method may be modified to include steps to create the polygonal cross section of the piece of wood 10. This is accomplished by adding the following steps:

Step B1: procure the retaining device 1 configured with the first engagement device 700 and the second engagement device 800, as described above.

Step B2: install said retaining device 1 onto the saw mill 20;

Step B3: secure the piece of wood 10 to the saw mill 20 using the first and second engagement devices 700,800 of said retaining device 1;

Step B4: use the saw mill 20 to make a plurality of cuts to the piece of wood 10, rotating the piece of wood 10 with said retaining device 1 between each cut, such that the piece of wood 10 ends up having a polygonal cross section;

Step B5: remove the piece of wood 10 from the saw mill 20;

Step B6: remove said retaining device 1 from the saw mill 20.

Step B1 may occur in any order relative to Steps A, B, and C. Step B2 occurs after Steps A, B, C, and B1. Steps B2 through B6 occur after Step B1 and before Step D, in the order stated.

Modifications and variations can be made to the disclosed embodiments of the present invention without departing from the subject or spirit of the invention as defined in the following claims.

I claim:

1. A retaining device for securing a piece of wood to a saw mill, said saw mill comprising a cutting saw, a first rail, a second rail, and a plurality of cross members, with said first and second rails spaced apart and oriented parallel to each other, said first and second rails being horizontally oriented, each of the said plurality of cross members running between the first and second rails and attached thereto, said cross members oriented substantially perpendicular to said rails, and said cutting saw positioned above said first and second rails, said retaining device comprising a first engagement device and a second engagement device spaced apart from the first engagement device, wherein the first engagement device and the second engagement device are configured to secure the piece of wood therebetween;

with the first engagement device comprising an elongate vertical support element having a first end and a second end, with a locking aperture formed into the elongate vertical support member proximate to its second end, a rotating disk having a plurality of positioning apertures disposed about said rotating disk proximate to a perimeter of said rotating disk and a plurality of fastener apertures disposed about the rotating disk, an axle, a plurality of fasteners, with each fastener configured to pass through one of the fastener apertures of the rotating disk of the first engagement device, and a locking pin configured to be inserted into and through one of the positioning apertures of the rotating disk of the first engagement device and into the locking aperture of the first engagement device, with the first end of the vertical support element of the first engagement device being attached to one of the plurality of cross members of the saw mill, the axle of the first engagement device is inserted into and through a central aperture located at the second end of the vertical support member of the first engagement device, and the rotating disk of the first engagement device is rotationally attached to the axle of the first engagement device; and with the second engagement device comprising an elongate vertical support element having a first end and a second end, a rotating disk having a plurality of fastener apertures disposed about the rotating disk, an axle, and a plurality of fasteners, with each fastener configured to pass through one of the fastener apertures of the rotating disk of the second engagement device, with the first end of the vertical support element of the second engagement device being attached to another of the cross members of the saw mill, said cross member being a different cross member than the cross member to which the first end of the first engagement device is attached;

the axle of the second engagement device being inserted into and through a central aperture located at the second end of the vertical support element of the second engagement device, and the rotating disk of the second engagement device rotationally attached to the axle of the second engagement device;

with the first engagement device having an unlocked mode and a locked mode, with the rotating disk of the first engagement device configured to rotate when in unlocked mode and not to rotate when in locked mode;

with rotation of the rotating disk of the first engagement device when in unlocked mode allowing one of the positioning apertures of the rotating disk of the first engagement device to come into alignment with the locking aperture of the first engagement device, and insertion of the pin of the first engagement device through an aligned positioning aperture of said rotating disk of the first engagement device and the locking aperture of the first engagement device placing the first engagement device in locked mode, and removal of said pin from said positioning and locking apertures of the first engagement device placing the first engagement device in unlocked mode;

whereby the piece of wood is secured by the retaining device by placing the piece of wood between the first engagement device and the second engagement device, inserting the plurality of fasteners of the first engagement device through the plurality of fastener apertures of the rotating disk of the first engagement device and into a first end of the piece of wood, inserting the plurality of fasteners of the second engagement device through the plurality of fastener apertures of the rotating disk of the second engagement device and into a second end of the piece of wood, and placing the first engagement device into locked mode.

2. A retaining device for securing a piece of wood to a saw mill, said saw mill comprising a cutting saw, a first rail, a second rail, and one or more cross members, with said first and second rails spaced apart and oriented parallel to each other, said first and second rails being horizontally oriented, each of the one or more cross members running between the first and second rails and attached thereto and with each of the one or more cross members oriented substantially perpendicular to said rails, and said cutting saw positioned above said first and second rails, said retaining device comprising a support carriage, said support carriage being elongate and rigid, with said support carriage being oriented perpendicular to one of the one or more cross members, said cross member being located proximate to an end of the saw mill, said support carriage being pivotally attached to said cross member, said support carriage comprising a plurality of laterally oriented guide rollers, said support carriage configured to support the piece of wood thereon whereby the piece of wood is supported by the support carriage by being placed onto the plurality of guide rollers.

3. The retaining device of claim 2 wherein there are an equal number of guide rollers on either side of the support carriage, wherein the piece of wood is supported between pairs of guide rollers.

4. The retaining device of claim 2 wherein each of the guide rollers is laterally adjustable with respect to the support carriage.

5. A retaining device for securing a piece of wood to a saw mill, said saw mill comprising a cutting saw, a first rail, a second rail, and one or more cross members, with said first and second rails spaced apart and oriented parallel to each other, said first and second rails being horizontally oriented, each of the one or more cross members running between the first and second rails and attached thereto and with each of the one or more cross members oriented substantially perpendicular to said rails, and said cutting saw positioned above said first and second rails, said retaining device comprising a support carriage, said support carriage being elongate and rigid, with said support carriage being oriented perpendicular to one of the one or more cross members, said cross member being located proximate to an end of the saw mill, said support carriage being pivotally attached to said cross member, said support carriage further comprises one or more central rollers, with each central roller attached to the support carriage and oriented laterally thereto, said support carriage configured to support the piece of wood thereon wherein each central roller is configured to support the piece of wood.

6. A method for forming geometric panels from a piece of wood using a saw mill, said saw mill comprising a cutting saw, a first rail, a second rail, a first support leg, and a second support leg, with said first and second rails spaced apart and oriented parallel to each other, said first and second rails being horizontally oriented, said first support leg attached to the first rail and oriented substantially perpendicular to the first rail, said second support leg attached to the second rail and oriented substantially perpendicular to the second rail, and said cutting saw positioned above said first and second rails, said method comprising the following steps:

Step A: procure the saw mill;
Step B: procure the piece of wood;
Step C: procure the retaining device of claim 2;
Step D: install the retaining device of claim 2 onto the saw mill such that the support carriage is set at a desired angle from the horizontal;
Step E: secure the piece of wood to the saw mill using the retaining device of claim 2; and
Step F: use the saw mill to make a plurality of cuts to the piece of wood;
wherein Steps A, B, and C may occur in any order; Step D occurs after Steps A and C; and Steps D, E, and F occur in the order as stated.

7. The method of claim 6, further comprising the following steps:
Step G: remove the piece of wood from the saw mill; and
Step H: remove the retaining device of claim 2 from the saw mill;
wherein Steps G and H occur after Step F, in the order stated.

8. The method of claim 6, wherein the piece of wood has a polygonal (regular or irregular) cross section.

9. The method of claim 6, further comprising the following steps:
Step B1: procure the retaining device of claim 1;
Step B2: install the retaining device of claim 1 onto the saw mill;
Step B3: secure the piece of wood to the saw mill using the retaining device of claim 1;
Step B4: use the saw mill to make a plurality of cuts to the piece of wood, rotating the piece of wood with the retaining device of claim 1 between each cut, such that the piece of wood ends up having a polygonal (regular or irregular) cross section;
Step B5: remove the piece of wood from the saw mill;
Step B6: remove the retaining device of claim 1 from the saw mill;
wherein Steps A, B, C, and B1 may occur in any order; Step B2 occurs after Steps A and B1; Step B3 occurs after Step B; and Steps B2 through B6 occur after Step B1 and before Step D, in the order stated.

10. A method for forming geometric panels from a piece of wood using a saw mill, said saw mill comprising a cutting saw, a first rail, and a second rail, with said first and second rails spaced apart and oriented parallel to each other, said first and second rails being horizontally oriented, and said cutting saw positioned above said first and second rails, said method comprising the following steps:

Step A: procure a retaining device for securing the piece of wood to the saw mill, said retaining device comprising a first engagement device and a second engagement device spaced apart from the first engagement device, wherein the first engagement device and the second engagement device are configured to secure the piece of wood therebetween;

with the first engagement device comprising an elongate vertical support element having a first end and a second end, with a locking aperture formed into the elongate vertical support member proximate to its second end, a rotating disk having a plurality of positioning apertures disposed about said rotating disk proximate to a perimeter of said rotating disk and a plurality of fastener apertures disposed about the rotating disk, an axle, a plurality of fasteners, with each fastener configured to pass through one of the fastener apertures of the rotating disk of the first engagement device, and a locking pin configured to be inserted into and through one of the positioning apertures of the rotating disk of the first engagement device and into the locking aperture of the first engagement device, with the first end of the vertical support element of the first engagement device being attached to one of the plurality of cross members of the saw mill, the axel of the first engagement device is inserted into and through a central aperture located at the second end of the vertical support member of the first engagement device, and the rotating disk of the first engagement device is rotationally attached to the axle of the first engagement device; and with the second engagement device comprising
an elongate vertical support element having a first end and a second end,
a rotating disk having a plurality of fastener apertures disposed about the rotating disk,
an axle, and
a plurality of fasteners, with each fastener configured to pass through one of the fastener apertures of the rotating disk of the second engagement device,
with the first end of the vertical support element of the second engagement device being attached to another of the cross members of the saw mill, said cross member being a different cross member than the cross member to which the first end of the first engagement device is attached;
the axle of the second engagement device being inserted into and through a central aperture located at the second end of the vertical support element of the second engagement device, and
the rotating disk of the second engagement device rotationally attached to the axle of the second engagement device;

with the first engagement device having an unlocked mode and a locked mode, with the rotating disk of the first engagement device configured to rotate when in unlocked mode and not to rotate when in locked mode;

with rotation of the rotating disk of the first engagement device when in unlocked mode allowing one of the positioning apertures of the rotating disk of the first engagement device to come into alignment with the locking aperture of the first engagement device, and insertion of the pin of the first engagement device through an aligned positioning aperture of said rotating disk of the first engagement device and the locking aperture of the first engagement device placing the first engagement device in locked mode, and removal of said pin from said positioning and locking apertures of the first engagement device placing the first engagement device in unlocked mode;

whereby the piece of wood is secured by the retaining device by placing the piece of wood between the first engagement device and the second engagement device, inserting the plurality of fasteners of the first engagement device through the plurality of fastener apertures of the rotating disk of the first engagement device and into a first end of the piece of wood, inserting the plurality of fasteners of the second engagement device through the plurality of fastener apertures of the rotating disk of the second engagement device and into a second end of the piece of wood, and placing the first engagement device into locked mode;

Step B: procure the piece of wood;

Step C: install the retaining device of claim 1 onto the saw mill;

Step D: secure the piece of wood to the saw mill using the retaining device of claim 1; and Step E: use the saw mill to make a plurality of cuts to the piece of wood, rotating the piece of wood with the retaining device of claim 1 between each cut, such that the piece of wood ends up having a polygonal (regular or irregular) cross section;

wherein Steps A and B may occur in any order, Step C occurs after Step A, Step D occurs after Steps B and C; and Step E occurs after Step D.

11. The method of claim 10, further comprising the following steps:

Step F: remove the piece of wood from the saw mill; and

Step G: remove the retaining device from the saw mill;

wherein Steps F and G occur after Step E, in the order stated.

\* \* \* \* \*